United States Patent
Nishida

(10) Patent No.: US 9,982,749 B2
(45) Date of Patent: May 29, 2018

(54) METHOD FOR MANUFACTURING ENDLESS METAL BELT, ENDLESS METAL BELT, AND BELT-TYPE CONTINUOUSLY VARIABLE TRANSMISSION

(75) Inventor: Koji Nishida, Nisshin (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 379 days.

(21) Appl. No.: 14/418,104

(22) PCT Filed: Aug. 31, 2012

(86) PCT No.: PCT/JP2012/072142
§ 371 (c)(1),
(2), (4) Date: Jan. 29, 2015

(87) PCT Pub. No.: WO2014/033907
PCT Pub. Date: Mar. 6, 2014

(65) Prior Publication Data
US 2015/0167781 A1    Jun. 18, 2015

(51) Int. Cl.
*B21D 53/14* (2006.01)
*C23C 8/24* (2006.01)
*F16G 5/16* (2006.01)
*C21D 1/30* (2006.01)
*C21D 9/00* (2006.01)
*C23C 8/02* (2006.01)
*C23C 8/26* (2006.01)

(52) U.S. Cl.
CPC .............. *F16G 5/16* (2013.01); *B21D 53/14* (2013.01); *C21D 1/30* (2013.01); *C21D 9/0068* (2013.01); *C23C 8/02* (2013.01); *C23C 8/24* (2013.01); *C23C 8/26* (2013.01)

(58) Field of Classification Search
CPC ............ C23C 8/24; B21D 53/24; B21D 53/14
See application file for complete search history.

(56) References Cited

U.S. PATENT DOCUMENTS

| | | | |
|---|---|---|---|
| 6,550,122 B1 * | 4/2003 | Imai | B21D 53/14 148/228 |
| 2002/0042977 A1 | 4/2002 | Mitsubayashi et al. | |
| 2004/0103708 A1 * | 6/2004 | Fukada | B21B 5/00 72/111 |

(Continued)

FOREIGN PATENT DOCUMENTS

| CN | 1486801 A | 4/2004 |
|---|---|---|
| CN | 102308118 A | 1/2012 |

(Continued)

OTHER PUBLICATIONS

Pye, David., "Practical Nitriding and Ferritic Nitrocarburizing," XP002754595, ISBN: 0871707918, relevant pp. 3 & 19.

(Continued)

*Primary Examiner* — Colleen P Dunn
*Assistant Examiner* — Rajinder Bajwa
(74) *Attorney, Agent, or Firm* — Sughrue Mion, PLLC

(57) ABSTRACT

A method for manufacturing an endless metal belt used in a belt-type continuously variable transmission, wherein a stress-relief heat treatment is performed after the circumference of a ring body has been adjusted, and aging/nitridation is performed after the stress-relief heat treatment.

3 Claims, 12 Drawing Sheets

(56) References Cited

U.S. PATENT DOCUMENTS

2011/0269591 A1   11/2011  Adomi
2012/0291923 A1*  11/2012  Nishida ................... C21D 1/06
                                                                      148/238

FOREIGN PATENT DOCUMENTS

| JP | 2004-162134 A | 6/2004 |
| --- | --- | --- |
| JP | 3622663 B2 | 2/2005 |
| JP | 2008-520437 A | 6/2008 |
| JP | 2009-7612 A | 1/2009 |
| JP | 2010-70834 A | 4/2010 |
| JP | 2011-185300 A | 9/2011 |
| JP | 2012-218004 A | 11/2012 |
| WO | 2006/054885 A1 | 5/2006 |
| WO | 2011/077579 A1 | 6/2011 |

OTHER PUBLICATIONS

International Search Report for PCT/JP2012/072142 dated Nov. 13, 2012.

* cited by examiner

US 9,982,749 B2

METHOD FOR MANUFACTURING ENDLESS METAL BELT, ENDLESS METAL BELT, AND BELT-TYPE CONTINUOUSLY VARIABLE TRANSMISSION

CROSS REFERENCE TO RELATED APPLICATIONS

This is a national phase application based on the PCT International Patent Application No. PCT/JP2012/072142 filed on Aug. 31, 2012, the entire contents of which are incorporated herein by reference.

TECHNICAL FIELD

The present invention relates to a method for manufacturing an endless metal belt forming a power transmission belt to be used in a belt-type continuously variable transmission mounted in a vehicle, the endless metal belt, and the belt-type continuously variable transmission.

BACKGROUND ART

For instance, an endless metal belt to be used in a belt-type continuously variable transmission mounted in a vehicle and used to transmit drive power is composed of a plurality of endless metal rings (e.g., nine rings) stacked or laminated in close contact with each other, the endless metal rings each having a circular-arc cross section and different circumferential lengths. In general, as a material of an endless metal ring, there is so far known maraging steel having superior strength characteristics. Further, an endless metal ring is made of a steel-strip annular member that has been subjected to rolling and thereafter to a solution treatment, a circumferential length adjusting (calibration), an aging-nitriding treatment in this order to enhance fatigue strength (for example, see Patent Document 1).

RELATED ART DOCUMENTS

Patent Documents

Patent Document 1: Japanese Unexamined Patent Application Publication (Translation of PCT Application) No. 2008-520437

SUMMARY OF INVENTION

Problems to be Solved by the Invention

However, the circumferential length adjusting (calibration) is an expanding work to slightly expand a ring body by looping the ring body over two rollers. After this work, the tensile residual stress and the compressive residual stress are accumulated in the ring body. When the circumferential length adjusting (calibration) is performed before the aging-nitriding treatment as in the technique of Patent Document 1, those residual stresses are not released in a later aging-nitriding treatment and thus different residual stresses are distributed between the outer peripheral side and the inner peripheral side of the ring body.

FIG. 15 is a graph showing residual stress distribution in a conventional ring body. This graph shows measurement results of residual stress in an endless metal ring manufactured by undergoing the steps in the conventional order by taking cross section of each ring body before the nitriding treatment and after the nitriding treatment by use of an X-ray stress measurement device to measure the residual stress from an outer peripheral surface to an inner peripheral surface. A horizontal axis represents distance (μm) from the outer peripheral surface in the ring body and a vertical axis represents residual stress (MPa). In the vertical axis, a minus side indicates compressive residual stress and a plus side indicates a tensile residual stress. From the above graph, it is found that before the nitriding treatment the compressive residual stress F0 is accumulated on the outer peripheral side of the ring body and a tensile residual stress G0 is accumulated on the inner peripheral side. The compressive residual stress F0 on the outer peripheral side gradually decreases from the outer peripheral surface toward the vicinity of the center and becomes zero near the center and in turn the tensile residual stress G0 on the inner peripheral side gradually increases toward the inner peripheral surface.

The above graph shows that, after the nitriding treatment whereby a nitrided layer has been formed with a predetermined depth (about 30 μm) from each of the outer peripheral surface and the inner peripheral surface of the ring body, the compressive residual stresses E0 and D0 are imparted on or close to the surfaces on the outer peripheral side and the inner peripheral side. However, the temperature of the nitriding treatment is on the order of 400 to 500° C. which is not so high as to melt alloy constituents into solid solution. Thus, the compressive residual stress and the tensile residual stress caused by the circumferential length adjusting (calibration) remain as-is left (corresponding to A0). Accordingly, as compared with a region (C0) where the nitrided layer on the outer peripheral side is absent, or ends, the tensile residual stress G0 previously accumulated by the circumferential length adjusting (calibration) on the inner peripheral side is much left near a region (B0) where the nitrided layer on the inner peripheral side is absent, or ends. Thus, a portion (corresponding to B0) in which the tensile residual stress is left more than in other portions is likely to become a weakest portion apt to cause fatigue fracture when the ring body is used in a continuously variable transmission.

To reduce the tensile residual stress mentioned above, there is known a method of subjecting the surface of the endless metal ring to shot-peening work. This method further needs an additional stress-relief treatment step, leading to an undesirable cost increase.

The present invention has been made to solve the above problems and has a purpose to provide an endless metal belt manufacturing method, an endless metal belt, and a belt-type continuously variable transmission, capable of reducing tensile residual stress accumulated on an inner peripheral side by circumferential length adjusting to thereby enhance fatigue strength without adding a new stress-relief treatment step.

Means of Solving the Problems (1) To achieve the above purpose, one aspect of the invention provides a method for manufacturing an endless metal belt to be used in a belt-type continuously variable transmission, the method including: performing a stress-relief heat treatment of a ring body after the ring body is subjected to a circumferential length adjusting work, and performing an aging-nitriding treatment of the ring body after the stress-relief heat treatment.

According to the above aspect, the ring body is subjected to the stress-relief heat treatment after the circumferential length adjusting work, and then to the aging-nitriding treatment after the stress-relief heat treatment. Accordingly, the ring body having therein little residual stress (the tensile residual stress and the compressive residual stress) generated due to the circumferential length adjusting work can be subjected to the aging-nitriding treatment. Thus, the nitrided layer is formed with a predetermined depth on each of the outer peripheral side and the inner peripheral side of the ring body in which residual stress (the tensile residual stress and the compressive residual stress) is hardly left. The thus formed nitrided layers allow compressive residual stress to be imparted nearly uniformly on the outer peripheral side and the inner peripheral side of the ring body. In other words, the magnitude of the compressive residual stress on the outer peripheral surface of the ring body and the magnitude of the compressive residual stress on the inner peripheral surface of the ring body become almost equal. Further, the magnitude of the tensile residual stress in a region on the outer peripheral side of the ring body where the nitrided layer is absent and the tensile residual stress in a region on the inner peripheral side of the ring body where the nitrided layer is absent also become almost equal. Thus, in the region on the inner peripheral side of the ring body where the nitrided layer ends, there is formed no weakest portion having the tensile residual stress left more than in other portions. Since the ring body in which the tensile residual stress and the compressive residual stress are hardly left is subjected to the aging-nitriding treatment, the tensile residual stress accumulated by the aging-nitriding treatment can be controlled to be nearly uniform and minimum in the wall thickness direction of the ring body.

(2) In the method for manufacturing an endless metal belt described in (1), preferably, the circumferential length adjusting work is performed after the ring body is subjected to rolling work.

According to the above aspect, the ring body is subjected to rolling work and then successively to the circumferential length adjusting work. Thus, the residual stress (the compressive residual stress and the tensile residual stress) by the rolling work and the residual stress (the compressive residual stress and the tensile residual stress) by the circumferential length adjusting work can be simultaneously released by one stress-relief heat treatment. In other words, various residual stresses accumulated in the ring body until the end of the circumferential length adjusting work can be simultaneously made almost zero in the single stress-relief heat treatment. Therefore, there is no need to add another stress-relief heat treatment. The stress-relief heat treatment is different according to materials of the ring body. For instance, a material such as maraging steel or precipitation hardening stainless steel will undergo a solution treatment, or solutionizing. A material such as austenite stainless steel will undergo stress-relief annealing. A material such as carbon steel (quench-hardened steel) will undergo a quenching treatment or both of a quenching treatment and a tempering treatment.

(3) In the method for manufacturing an endless metal belt described in (1) or (2), preferably, the stress-relief heat treatment is performed on a plurality of ring bodies in a lamination state, each of the ring bodies having been subjected to the circumferential length adjusting work.

According to the above aspect, the stress-relief heat treatment is performed on a laminated body of the plurality of ring bodies each having been subjected to the circumferential length adjusting. The entire laminated ring bodies can provide enhanced rigidity, thereby enabling reducing the occurrence of undulation or deformation of an edge face of each ring body during stress-relief heat treatment. Therefore, when used in the belt continuously variable transmission, the ring bodies can reduce the interference between an edge face of the endless metal belt in its width direction and neck portions of elements or the interference between an edge face the endless metal belt in the width direction and wall surfaces of a V-shaped groove of a pulley. Further, since the ring bodies are laminated and then subjected to the stress-relief heat treatment, a heat treatment furnace can be greatly reduced in size and thus reduce facility cost and energy cost.

(4) To achieve the above purpose, another aspect of the invention provides an endless metal belt manufactured by the method for manufacturing an endless metal belt as described in any one of (1) to (3).

According to the above aspect, it is possible to provide an endless metal belt with high fatigue strength at low cost by reducing tensile residual stress on the inner peripheral side accumulated by the circumferential length adjusting.

(5) In the endless metal belt described in (4), preferably, the ring body has residual stress almost equally accumulated on an outer peripheral side and an inner peripheral side of the ring body.

According to the above aspect, the ring body or bodies have residual stress almost equally accumulated on the outer peripheral side and the inner peripheral side. Thus, stress load in a region where a nitrided layer on the inner peripheral side corresponding to a conventional weakest portion is absent can be reduced, leading to improved fatigue life. To be concrete, it is more preferable that the magnitude of the compressive residual stress on the outer peripheral surface of the ring body and the magnitude of the compressive residual stress on the inner peripheral surface of the ring body become nearly equal, and, the magnitude of the tensile residual stress in a region on the outer peripheral side of the ring body where a nitrided layer is absent and the magnitude of the tensile residual stress in the region on the outer peripheral side of the ring body where the nitrided layer is absent become nearly equal. This configuration can made the tensile residual stress accumulated in the ring body almost uniform and minimum in the wall thickness direction of the ring body and can accumulate the compressive residual stress with good balance on the outer peripheral side and the inner peripheral side of the ring body to further improve the fatigue life.

(6) To achieve the above purpose, still another aspect of the invention provides a belt-type continuously variable transmission including the endless metal belt as described in (4) or (5).

According to this aspect, it is possible to reduce the stress amplitude on the endless metal belt during use and thus provide the continuously variable transmission with long fatigue life at low cost.

Effects of the Invention

According to the invention, it is possible to provide a method for manufacturing an endless metal belt capable of reducing tensile residual stress on an inner peripheral side accumulated by circumferential length adjusting without adding another stress-relief treatment step to improve fatigue strength, the endless metal belt, and a belt-type continuously variable transmission.

MODE FOR CARRYING OUT THE INVENTION

A detailed description of a preferred embodiment of a method for manufacturing an endless metal belt, the endless metal belt, and a belt-type continuously variable transmission embodying the present invention will now be given referring to the accompanying drawings.

<Structure of a Belt-type Continuously Variable Transmission and an Endless Metal Belt>

Figure 1:
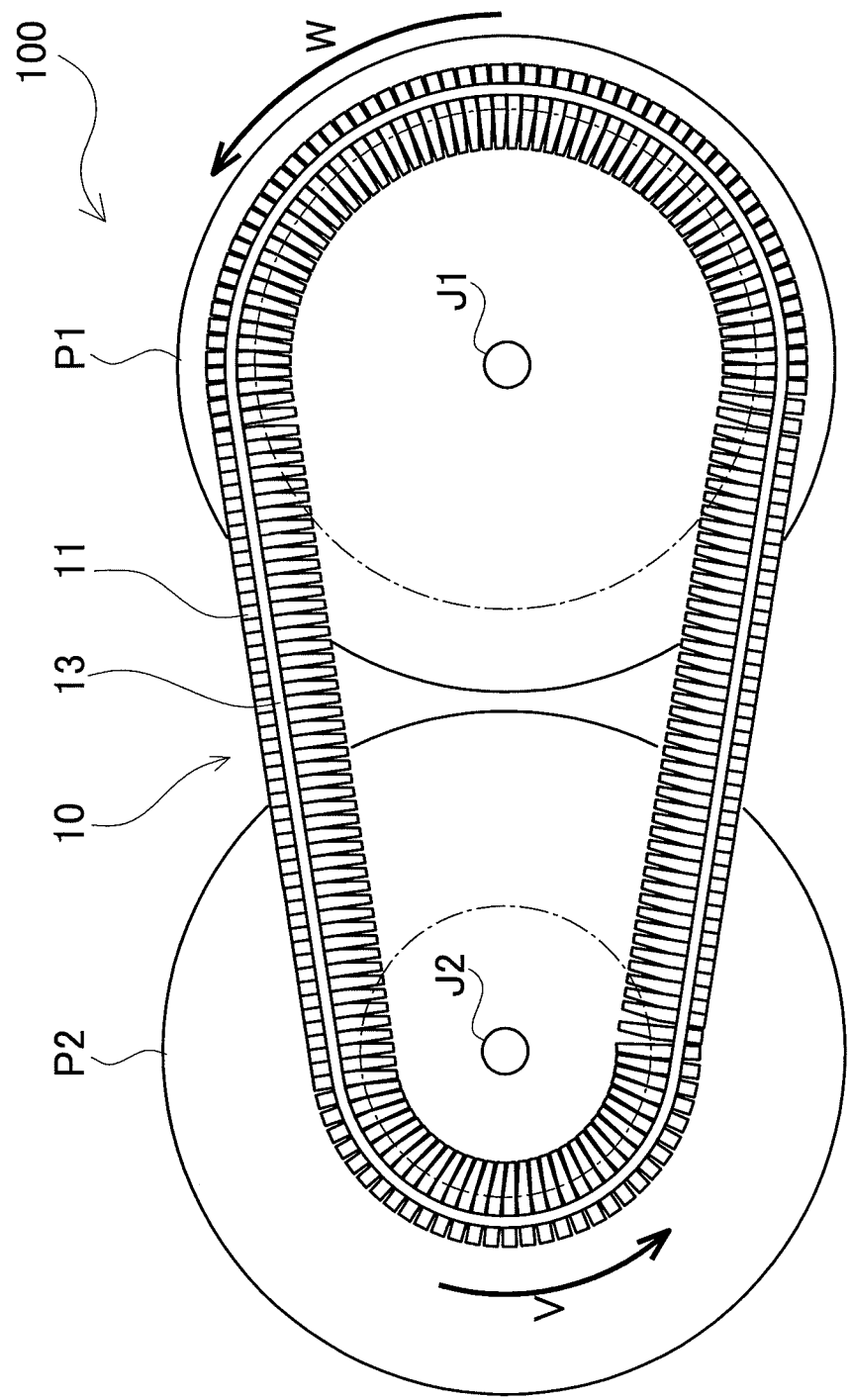
FIG. 1 is a schematic vertical sectional view of a belt-type continuously variable transmission according to the invention.
Figure 2:
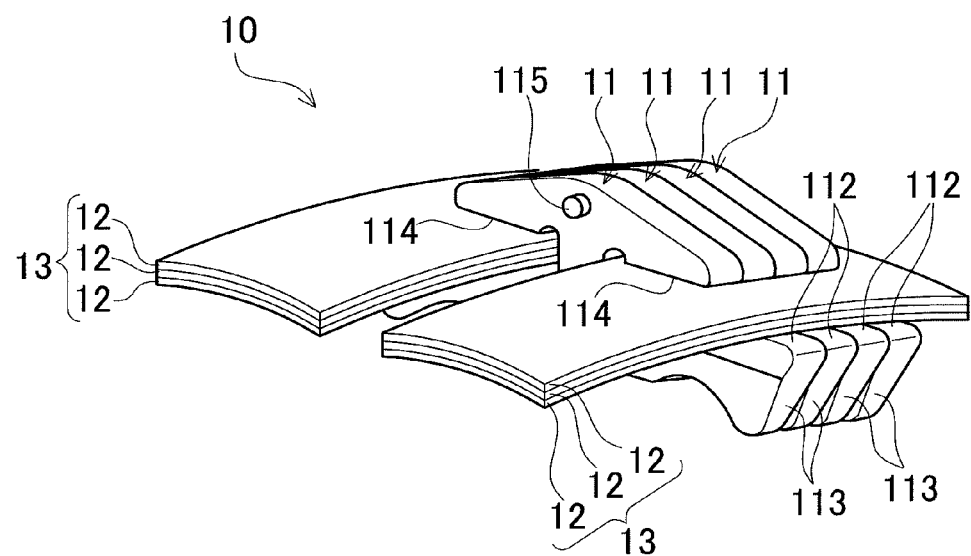
FIG. 2 is a perspective view showing a part of an endless metal belt in a circumferential direction to be used in the belt-type continuously variable transmission shown in FIG. 1.
Figure 3:
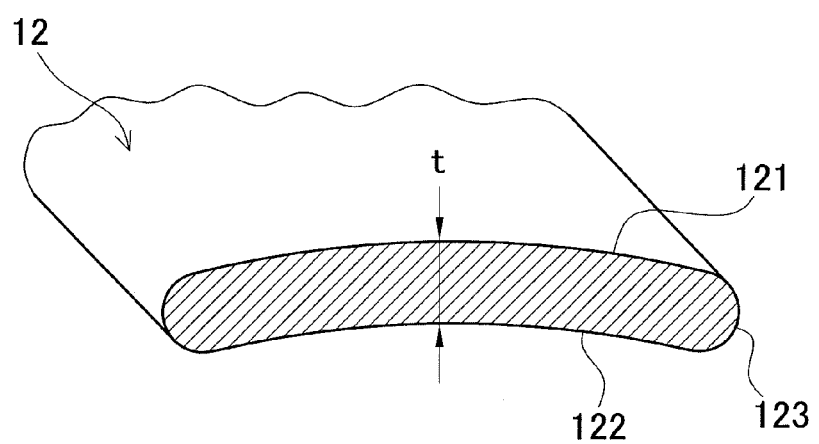
FIG. 3 is a perspective view showing a part of an endless metal ring forming the endless metal belt shown in FIG. 2.

The structure of the belt-type continuously variable transmission and the endless metal belt to be used therein will be first explained. FIG. 1 is a schematic vertical sectional view of the belt-type continuously variable transmission according to the invention. FIG. 2 is a perspective view showing a part of the endless metal belt in a circumferential direction to be used in the belt-type continuously variable transmission shown in FIG. 1. FIG. 3 is a perspective view showing a part of an endless metal ring forming the endless metal belt shown in FIG. 2.

As shown in FIG. 1, a belt-type continuously variable transmission 100 includes an input shaft J1 coupled to a drive source, an output shaft J2 coupled to wheels, a drive pulley P1 and a driven pulley P2 which are provided integral with the corresponding input shaft J1 and output shaft J2 and are each formed with a V-shaped groove changeable in width, and a power transmission belt 10 wound in the V-shaped grooves of the drive pulley P1 and the driven pulley P2 and configured to transmit drive power. This continuously variable transmission 100 is configured to change the width of each V-shaped groove of the drive pulley P1 and the driven pulley P2, thereby changing the winding diameter of the power transmission belt 10 to continuously change a relative rotation speed ratio (V/W) of the input shaft J1 and the output shaft J2.

As shown in FIG. 2, the power transmission belt 10 includes two sets of endless metal belts 13 each of which is composed of a plurality of endless metal rings 12 having different circumferential lengths and being laminated in close contact in a wall thickness direction, and a plurality of metal elements 11 having plate-like bodies arranged annularly in the circumferential direction of the endless metal belts 13, 13. It is to be noted that FIG. 2 shows three endless metal rings 12 in a lamination state for simplifying the figure. The number of laminated endless metal rings 12 is however not limited thereto and may be nine or twelve.

On both sides of each metal element 11 in the width direction, belt holding grooves 114 are formed nearly horizontally, leaving a neck portion at the center. A lower end of the belt holding grooves 114 forms a saddle portion 112 contacting with inner peripheral surfaces of the endless metal belts 13. Inclination surfaces of the saddle portions 112 inclining inward and downward from the end faces of the saddle portions 112 in the width direction are drive transmission portions 113 in friction contact with the wall surfaces of each V-shaped groove of the drive pulley P1 and the driven pulley P2 to transmit drive power. The metal elements 11 transmit the drive power in such a manner that each front-side metal element 11 in the rotation direction is pushed by each rear-side metal element 11 in the rotation direction. A boss 115 is formed on a front surface above each of the neck portions. Each boss 115 is engaged in a recess not shown formed in a back surface above each neck portion to prevent mutual positional displacement of the continuously arranged metal elements 11. The metal elements 11 can be made of a high abrasion-resistant steel material, for example, carbon tool steels (SK material).

As shown in FIG. 3, an outer peripheral surface 121 and an inner peripheral surface 122 of each endless metal ring 12 are formed in a crowning shape that is curved slightly upward at a center in section. The radius of the crowing shape is for example on the order of 800 mm. This crowning shape can facilitate keeping the lamination state. Each edge face 123 of the endless metal ring 12 in the width direction is formed in a smooth shape. The edge faces 123 in the width direction are formed by barrel polishing or the like when burrs or the like are removed from a ring body cut apart from a cylindrical body. The wall thickness t of each endless metal ring 12 is substantially constant and for example can be on the order of 180 to 190 μm. In the present embodiment, the material of the endless metal rings 12 is maraging steel that necessarily contains iron, nickel, and molybdenum and also appropriately contains, as needed, cobalt, titanium, aluminum, and others. The content of nickel in the maraging steel is not limited to 18 to 19 weight % and could be on the order of 20 to 25 weight %. The content of molybdenum is preferably at least 3 weight % or more.

<Method for Manufacturing the Endless Metal Belt>

The method for manufacturing the endless metal belt will be explained below. This endless metal belt manufacturing method in the present embodiment includes a method defined by a first manufacturing process and a method defined by a second manufacturing process.

(First Manufacturing Process)

Figure 4:
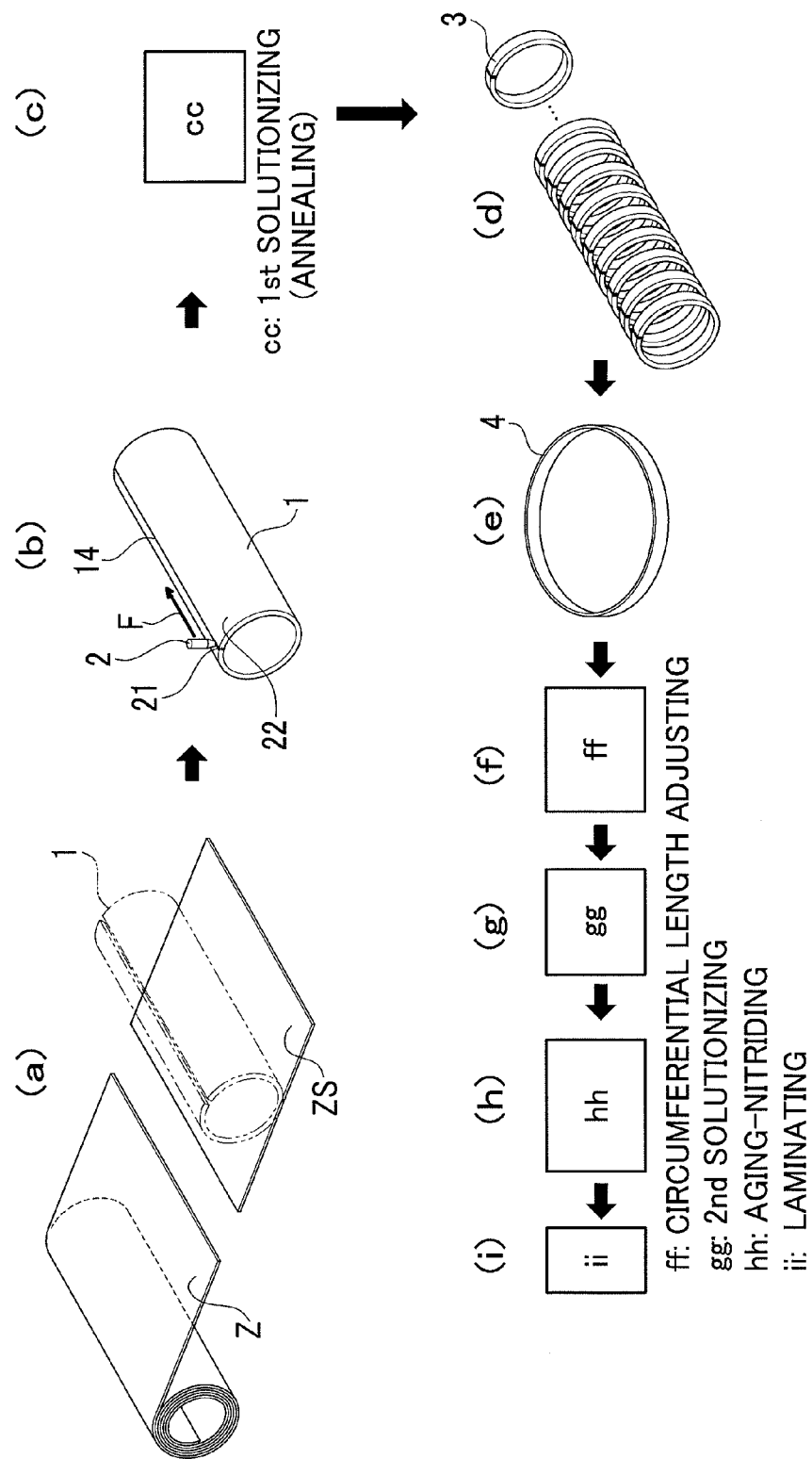
FIG. 4 is a diagram of a first manufacturing process for the endless metal belt according to the invention.

A diagram of the first manufacturing process will be first explained. FIG. 4 is the diagram of the first manufacturing process for the endless metal belt according to the invention. As shown in FIG. 4, the first manufacturing process for the endless metal belt includes (a) a cylindrical body forming step, (b) a joining step, (c) a first solutionizing (annealing)

step, (d) a ring cutting step, (e), a rolling step, (f) a circumferential length adjusting step, (g) a second solutionizing step, (h) an aging-nitriding treatment step, and (i) a laminating step. These steps are performed in the order of (a) to (i).

(a) The cylindrical body forming step is a step of forming a cylindrical body 1 having a predetermined length in an axial direction and being open at both ends in the axial direction. In this step, a strip-shaped maraging steel sheet Z is wound off from a coil, cut into a sheet ZS of a predetermined size, and then bent to bring opposite edges into abutment with each other. This bending work may include a method using a roll or a die. The wall thickness of the cylindrical body 1 is about 0.4 to 0.5 mm and the diameter of the same is about 100 to 200 mm.

(b) The joining step is a step of joining the opposite edges of the cylindrical body 1 brought in abutment. This joining method may include a welding method by melting the opposite edges by plasma welding, laser welding, or the like, a diffusion joining method by removing oxidized film of the edges. In the present embodiment, the plasma welding method is adopted. A welding device 2 is placed opposite a butting portion 14 of the cylindrical body 1, and either the cylindrical body 1 or a nozzle of the welding device 2 is moved in the axial direction (an arrow F direction) to perform butt welding. A weld portion 21 is formed to penetrate from the outer peripheral surface to the inner peripheral surface of the cylindrical body 1. When shrinkage or sinkage occurs at a boundary between the weld portion 21 and a base material portion 22, it leads to strength deterioration. Thus, welding conditions (spot diameter, nozzle direction, welding speed, etc.) that cause no shrinkage are selected.

(c) The first solutionizing (annealing) step is a step of homogenizing the hardness of the cylindrical body 1 that was partially hardened during the welding process in order to perform nearly uniform rolling in the rolling step to be performed later. In this solutionizing step, the welded cylindrical body 1 is put in an axially upright posture on a mesh belt or the like and then conveyed into a heat treatment furnace and subjected to the first solutionizing. The first solutionizing is carried out by heating the cylindrical body 1 to a temperature equal to or higher than a temperature at which alloy constituents are dissolved in a solid solution, and holding the cylindrical body 1 for a required time and then cooling it. If the hardness of the weld portion is in a hardness range corresponding to such a degree as to enable nearly uniform rolling in the subsequent rolling step, the present step can be skipped.

(d) The ring cutting step is a step of cutting the cylindrical body 1 having homogenized hardness, in a direction perpendicular to the axial direction into a plurality of annular members 3 each having a predetermined length in the axial direction. This cutting method may include a mechanical cutting method by making a blade edge of a cutter sequentially dig into the cylindrical body 1 in a circumferential direction, a thermally cutting method by melt cutting by use of a laser or the like, etc. Since irregularity (protrusions and depressions) such as burrs generated in a cut area is likely to cause stress concentration thereon during use, barrel polishing or the like is carried out to remove such irregularity and smoothen the surface of each annular member 3.

(e) The rolling step is a step of rolling each polished annular member 3 to be extended to nearly a wall thickness usable as an endless metal ring 12. The rolling method may include for example a roller rolling method in which an annular member 3 is wound over two opposed rollers, and a third roller is provided to press the annular member 3 against one of the two rollers and move in the circumferential direction to extend the circumferential length of the annular member 3. The circumferential length of a rolled ring body 4 is about 600 to 700 mm.

(f) The circumferential length adjusting step is a step of adjusting the circumferential length of each rolled ring body 4 to a predetermined circumferential length determined according to the order of lamination prior to forming the endless metal belt 13 by laminating a plurality of endless metal rings 12. The circumferential length adjusting method may include for example a roller adjusting method in which a ring body 4 is wound over two opposed rollers and applied with tensile force while measuring a distance of one of the roller from the other roller. Errors after the circumferential length adjusting are controlled to about dozen or so μm to allow the ring bodies 4 to be laminated in close contact relation.

(g) The second solutionizing step is a step of recrystallizing metal texture of each ring body having the adjusted circumferential length to restore crystal structure of the metal texture deformed by the rolling work and the circumferential length adjusting work, thereby relieving or removing processing strain and internal stress (including residual stress). In this step, a second solutionizing treatment is performed by locking the ring body after the circumferential length adjusting in a posture vertically extending in an axial direction on a carrying jig and conveyed into a heat treatment furnace. The second solutionizing is performed by heating the ring body to a temperature equal to or higher than a temperature at which alloy constituents of the ring body are dissolved in a solid solution, and holding the ring body for a required time, and then cooling it. For example, the heating temperature is about 820° C. and the holding time is about 2 minutes.

(h) The aging-nitriding treatment step is a step of subjecting each ring body having the adjusted circumferential length and having undergone the second solutionizing to the aging treatment to precipitate alloy elements to ensure predetermined hardness and also to the nitriding treatment to form a nitrided layer with a predetermined depth on a front surface side of the ring body to impart compressive residual stress therein. The aging-nitriding treatment is carried out in a continuous furnace. In particular, to allow nitriding gas to uniformly diffuse over the surface of each ring body, a plurality of the ring bodies are locked on a special carrying jig capable of arranging the ring bodies at intervals in the axial direction and passed through the continuous furnace. A heat treatment history of each ring body is managed to allow later checking.

(i) The laminating step is a step of laminating selected ones of the ring bodies (endless metal rings 12) having been subjected to the aging-nitriding treatment, the selected ones whose circumferential lengths are larger from one on the inner peripheral side toward another on the outer peripheral side, thereby forming an endless metal belt 13. When this belt 13 is used as the power transmission belt 10 in the belt-type continuously variable transmission 100, the endless metal rings 12 forming the endless metal belt 13 could not receive uniformly the stress exerted thereon in case the endless metal rings 12 are not in close contact with one another. Accordingly, the endless metal rings 12 have to be laminated in close contact with one another almost uniformly over the entire circumference.

(Second Manufacturing Process)

Figure 5:
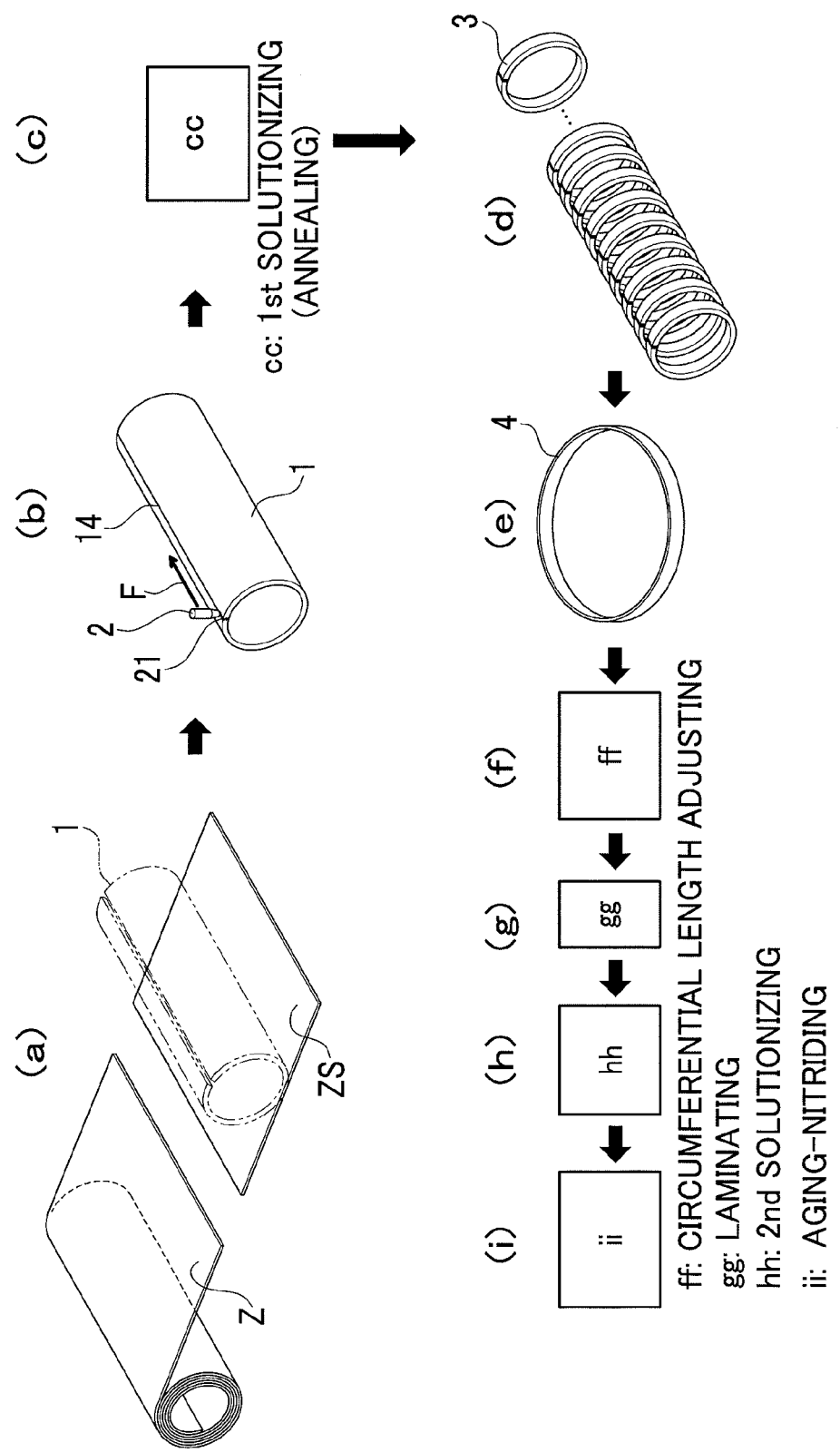
FIG. 5 is a diagram of a second manufacturing process for the endless metal belt according to the invention.
Figure 6:
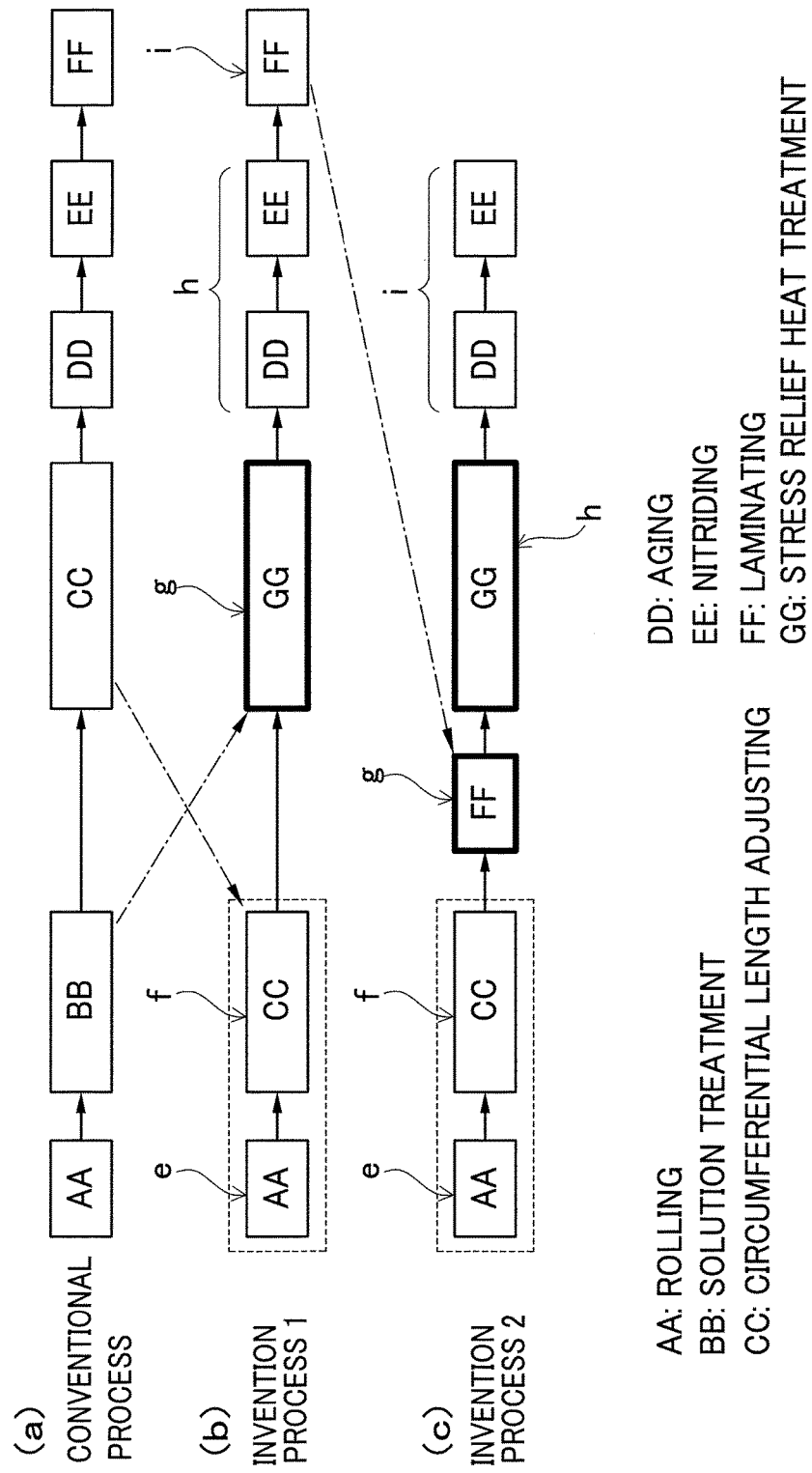
FIG. 6 is a process chart showing manufacturing processes for endless metal belts for comparison.
Figure 7:
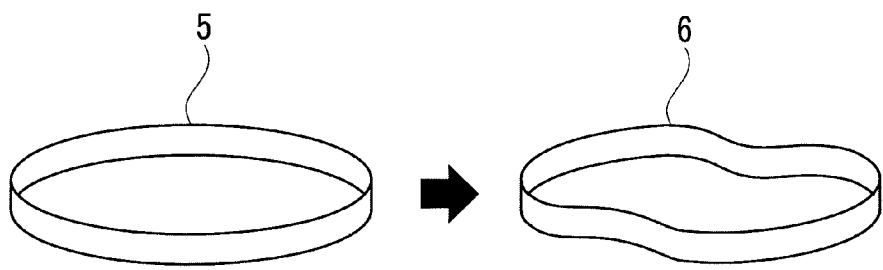
FIG. 7 is a perspective view of ring bodies subjected to a stress-relief heat treatment in the first manufacturing process.
Figure 8:
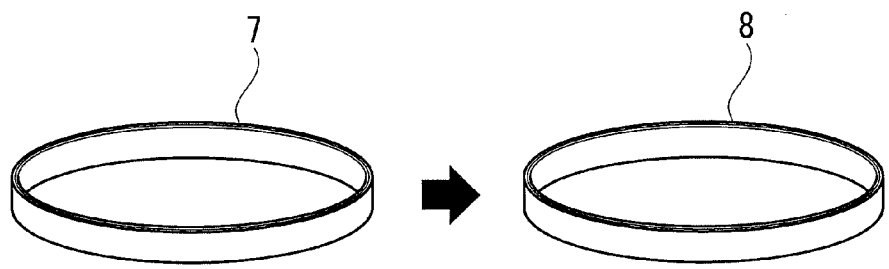
FIG. 8 is a perspective view of ring bodies subjected to a stress-relief heat treatment in the second manufacturing process.
Figure 13:
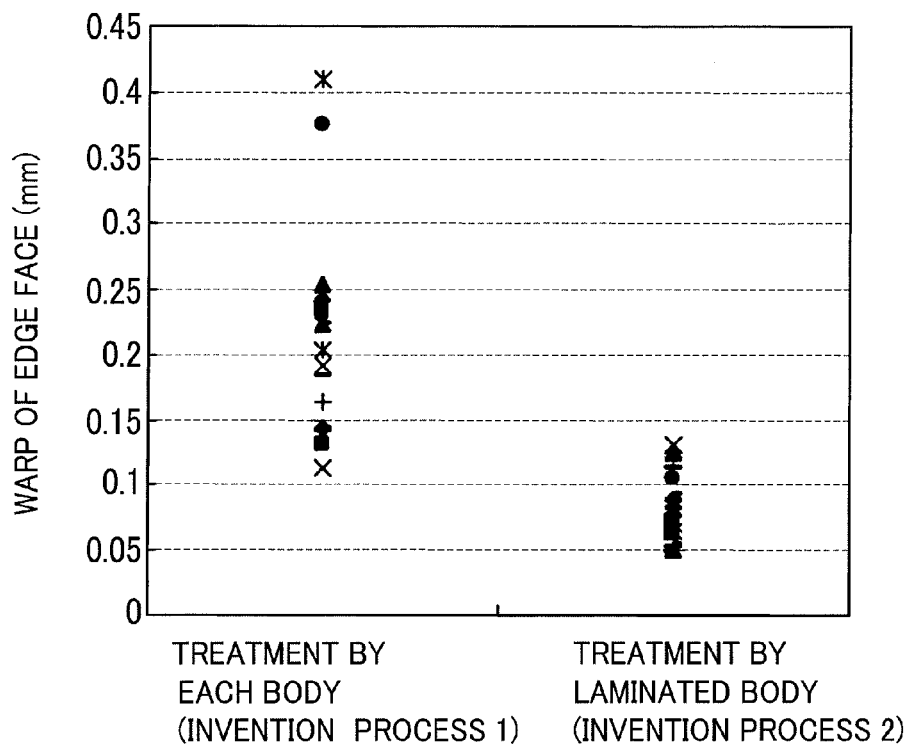
FIG. 13 is a graph showing a warped amount of an edge face of the ring body after the stress-relief heat treatment.

A diagram of the second manufacturing process will be explained below. FIG. 5 is the diagram of the second manufacturing process for the endless metal belt according to the invention. FIG. 6 is a process chart showing the manufacturing processes for endless metal belts for comparison. FIG. 7 is a perspective view of a ring body having been subjected to the stress-relief heat treatment in the first manufacturing process. FIG. 8 is a perspective view of an endless metal belt having been subjected to the stress-relief heat treatment in the second manufacturing process. FIG. 13 is a graph showing a warped amount of an edge face of each ring body after the stress-relief heat treatment.

As shown in FIG. 5, the second manufacturing process for the endless metal belt includes (a) a cylindrical body forming step, (b) a joining step, (c) a first solutionizing (annealing) step, (d) a ring cutting step, (e) a rolling step, (f) a circumferential length adjusting step, (g) a laminating step, (h) a second solutionizing step, and (i) an aging-nitriding treatment step. These steps are performed in the order of (a) to (i). In the method for manufacturing the endless metal belt according to present invention, differences between the first manufacturing process and the second manufacturing process are only in that the laminating step of the ring body is performed after the aging-nitriding treatment (the first manufacturing process) or the laminating step of the ring body is performed after the circumferential length adjusting (the second manufacturing process) as shown in FIG. 6. The details in each step (a) to (i) are explained above in the first manufacturing process and thus skipped hereinafter.

As shown in FIG. 6(*b*), in the first manufacturing process, after rolling and circumferential length adjusting, each ring body is subjected separately to the stress-relief heat treatment. Thus, the ring body 5 having flat edge faces after the circumferential length adjusting may be transformed to a ring body 6 whose edge faces are undulated or deformed during stress-relief heat treatment. On the other hand, as shown in FIG. 6(*c*), in the second manufacturing process, after the rolling and the circumferential length adjusting, a plurality of the ring bodies are laminated in close contact with one another, thereby enhancing the rigidity of the entire ring bodies, so that the laminated ring bodies undergo the stress-relief heat treatment. Accordingly, as shown in FIG. 8, the laminated ring bodies 7 after the circumferential length adjusting could be produced as ring bodies 8 whose edge faces are less likely to be undulated or deformed during the stress-relief heat treatment. To be concrete, as shown in FIG. 13, when the ring bodies are treated one by one (Process 1 of the present invention: the first manufacturing process), the edge-face warped amounts of the ring bodies subjected to the stress-relief heat treatment were about 0.1 to 0.4 mm. In contrast, when the ring bodies are treated in lamination form (Process 2 of the present invention: the second manufacturing process), the edge-face warped amounts of the ring bodies subjected to the stress-relief heat treatment were about 0.05 to 0.13 mm, with great reduction of undulation or deformation during the stress-relief heat treatment.

Figure 9:
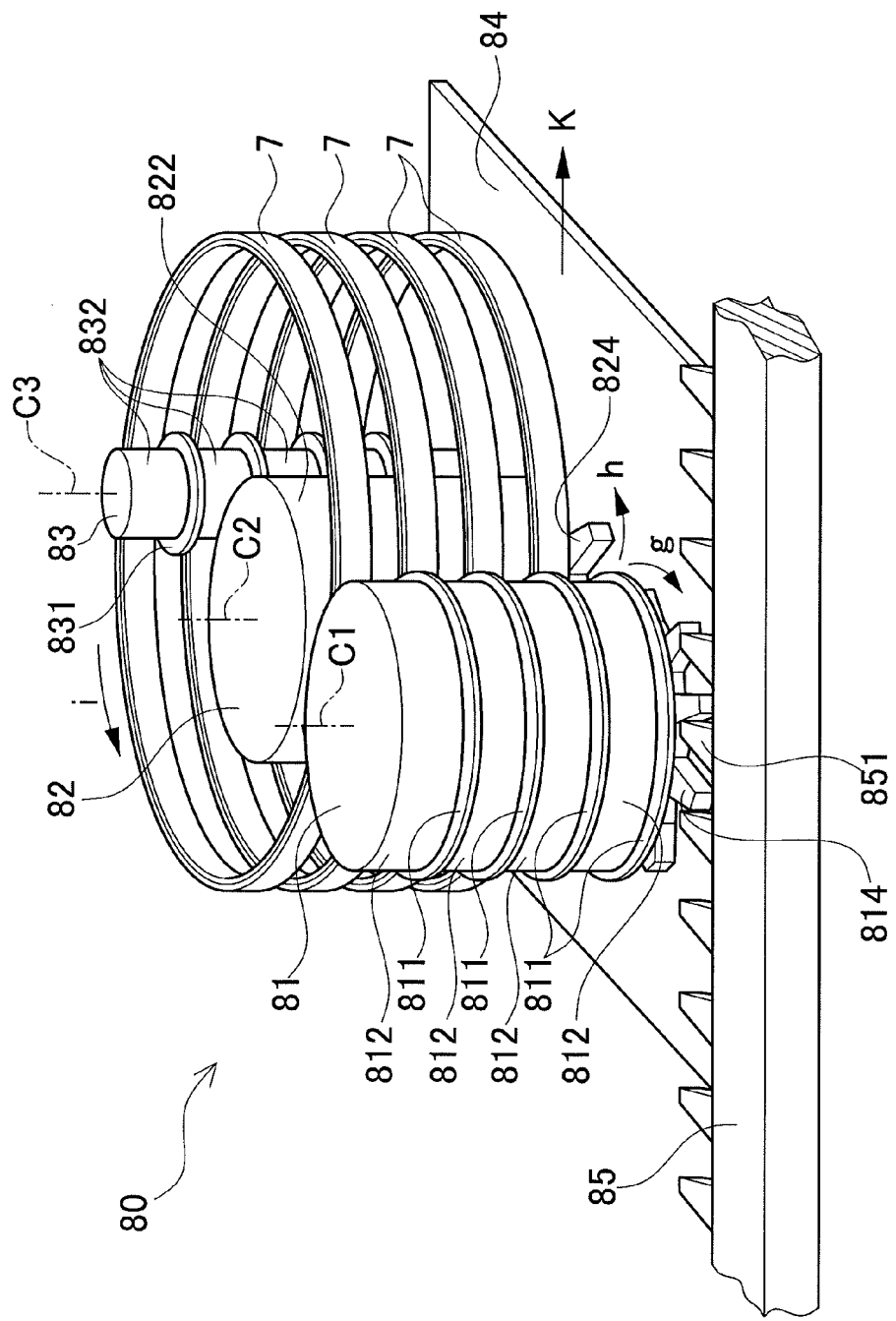
FIG. 9 is a perspective view of a carrying jig for conveying laminated ring bodies during an aging-nitriding treatment in the second manufacturing process.
Figure 10:
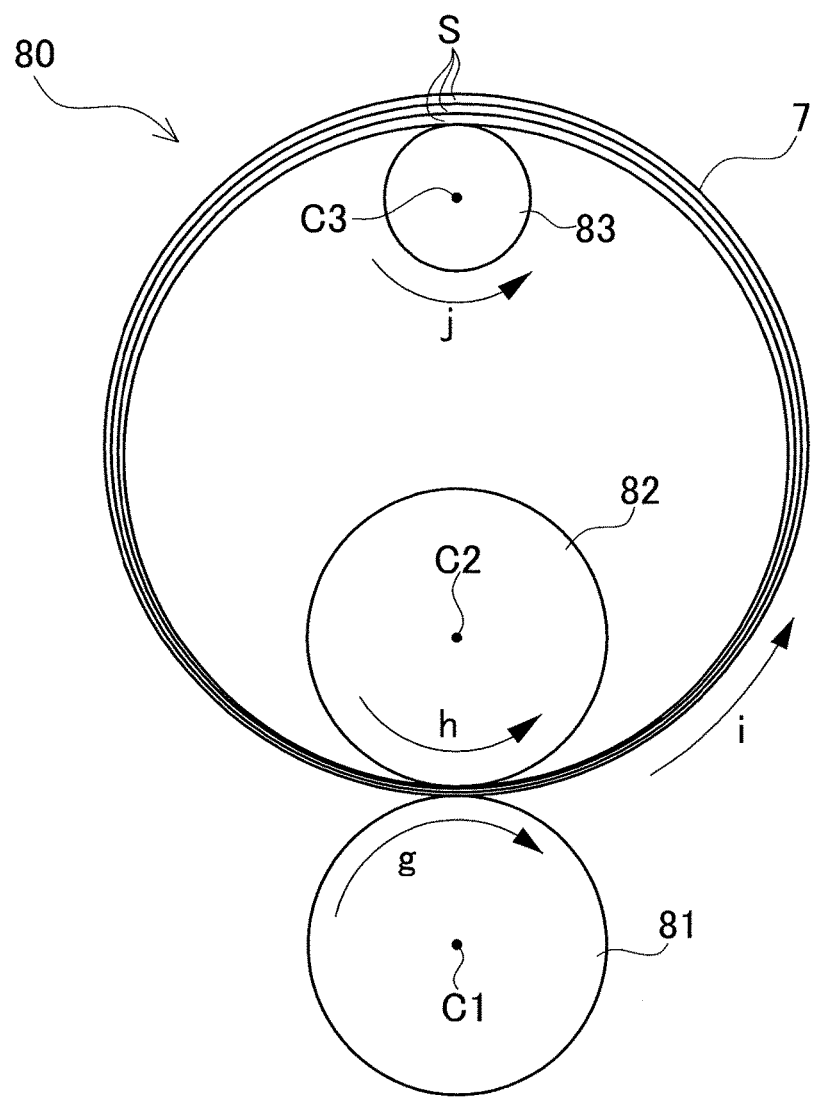
FIG. 10 is a top view of the laminated ring bodies shown in FIG. 9.

In the aging-nitriding treatment step (i) in the second manufacturing process shown in FIG. 5, the carrying jig is adapted to uniformly diffuse nitriding gas over the laminated ring bodies 7, as explained below. FIG. 9 is a perspective view of the carrying jig for conveying the laminated ring bodies during the aging-nitriding treatment in the second manufacturing process. FIG. 10 is a top view of the laminated ring bodies shown in FIG. 9.

As shown in FIG. 9, for the aging-nitriding treatment in the second manufacturing process, a carrying jig 80 for conveying the laminated ring bodies 7 in a locked state includes a first support roller 81, a second support roller 82, and a third support roller 83, respective axes C1, C2, and C3 being upright in a vertical direction, a rectangular support table 84 pivotally supporting a lower end of each of the support rollers, and a carrying rack 85 that is arranged adjacent to the support table 84 and extends in a carrying direction. The first support roller 81 includes cylindrical surfaces 812 contacting with the outer peripheral surfaces of the laminated ring bodies 7 and flanges 811 contacting with the edge faces of the laminated ring bodies 7. The flanges 811 are arranged more than one and spaced at predetermined intervals in the axial direction. The second support roller 82 is provided vertically and opposed to the first support roller 81 to clamp the laminated ring bodies 7 from the inner peripheral side thereof. The second support roller 82 has a cylindrical surface 822 contacting with the inner peripheral surfaces of the laminated ring bodies 7. The third support roller 83 is provided vertically in a position symmetric to the second support roller 82 with respect to the axis of the laminated ring bodies 7 and has cylindrical surfaces 832 contacting with the inner peripheral surfaces of the laminated ring bodies 7. The third support roller 83 includes flanges 831 as many as the flanges 811 of the first support roller 81 and at the same level of the corresponding flanges 811. The diameter of the cylindrical surfaces 832 of the third support roller 83 is smaller than the diameter of the cylindrical surfaces 812 of the first support roller 81 and the cylindrical surface 822 of the second support roller 82. The first support roller 81 is provided at its lower end with a gear 814 engaging with a straight gear 851 of the carrying rack 85. The second support roller 82 is provided with at its lower end with a gear 824 engaging with the gear 814.

As shown in FIGS. 9 and 10, when the support table 84 is moved in the carrying direction (an arrow K direction), the first support roller 81 is rotated in an arrow g direction, while the second support roller 82 is rotated in an arrow h direction. The laminated ring bodies 7 clamped between the first support roller 81 and the second support roller 82 are thus rotated in an arrow i direction in association with rotation of the first support roller 81 and the second support roller 82. The third support roller 83 is rotated in an arrow j direction in association with rotation of the laminated ring bodies 7 in the arrow i direction.

At that time, each set of the laminated ring bodies 7 is formed with gaps S between the ring bodies around one side (near the third support roller 83) opposed to the other side clamped between the first support roller 81 and the second support roller 82. The position of the gaps S moves in a circumferential direction of the laminated ring bodies 7 as the support table 84 is moved in the carrying direction (the arrow K direction). Accordingly, in association with movement of the carrying jig, nitriding gas can be uniformly diffused over each one of the laminated ring bodies 7.

<Residual Stress Distribution in the Ring Body and Fatigue Life of the Endless Metal Belt>

Figure 11:
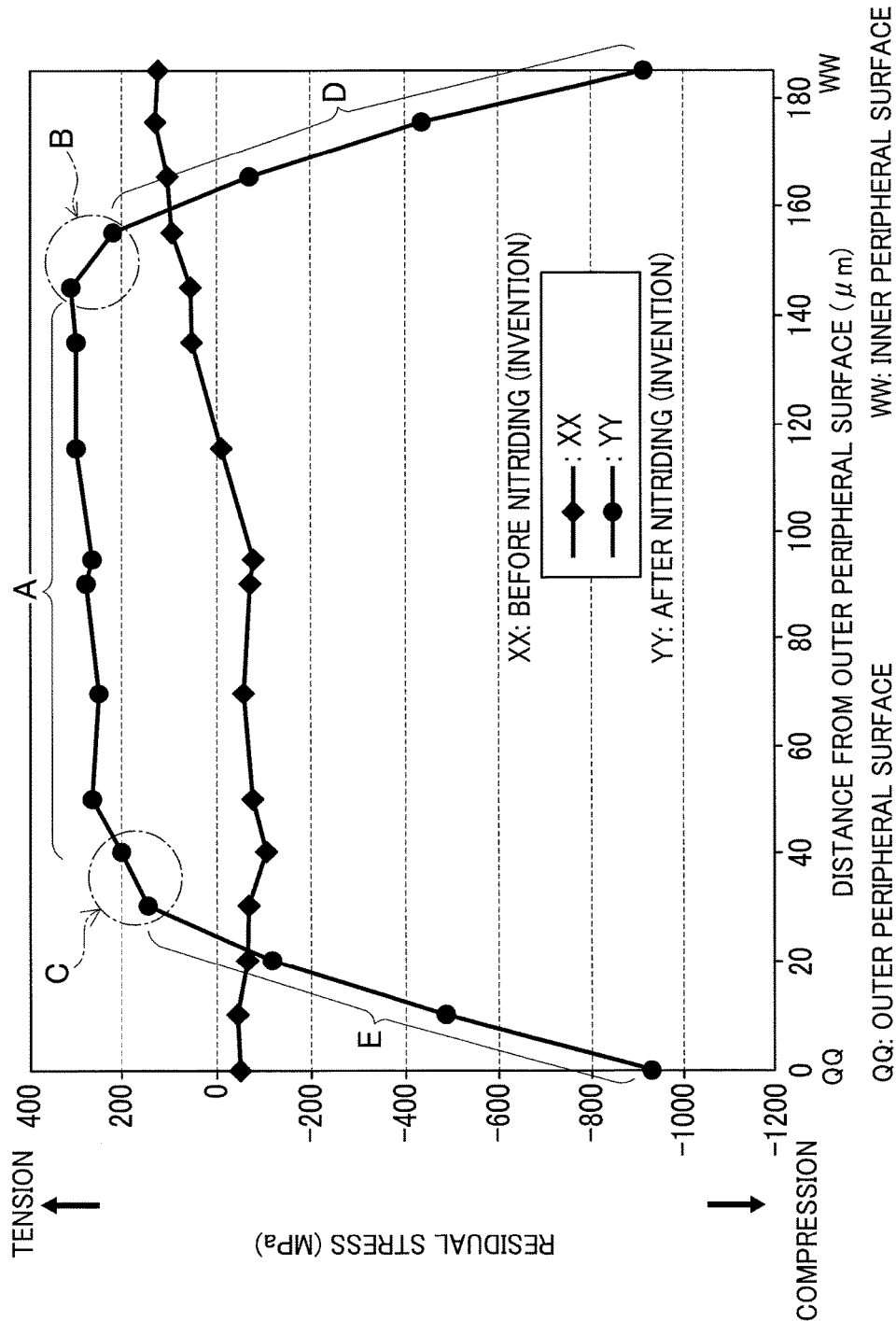
FIG. 11 is a graph showing residual stress distribution in a ring body according to the invention.
Figure 12:
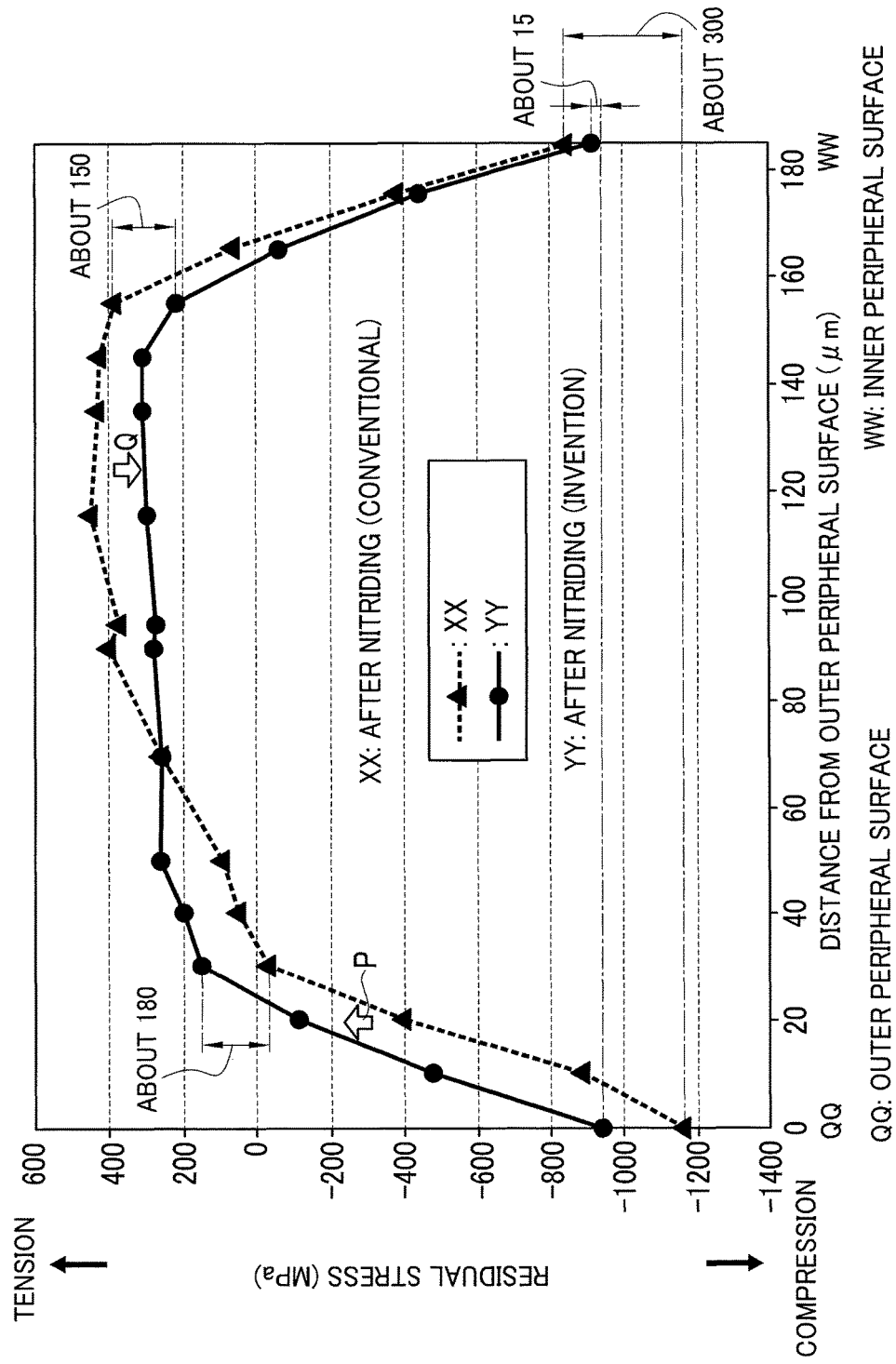
FIG. 12 is a graph showing differences in residual stress distribution in ring bodies between a conventional art and the present invention.
Figure 14:
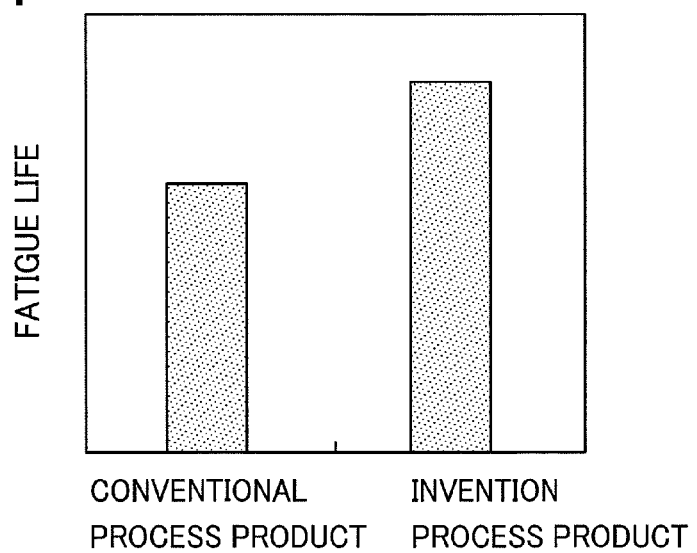
FIG. 14 is a graph showing fatigue life of an endless metal belt.
Figure 15:
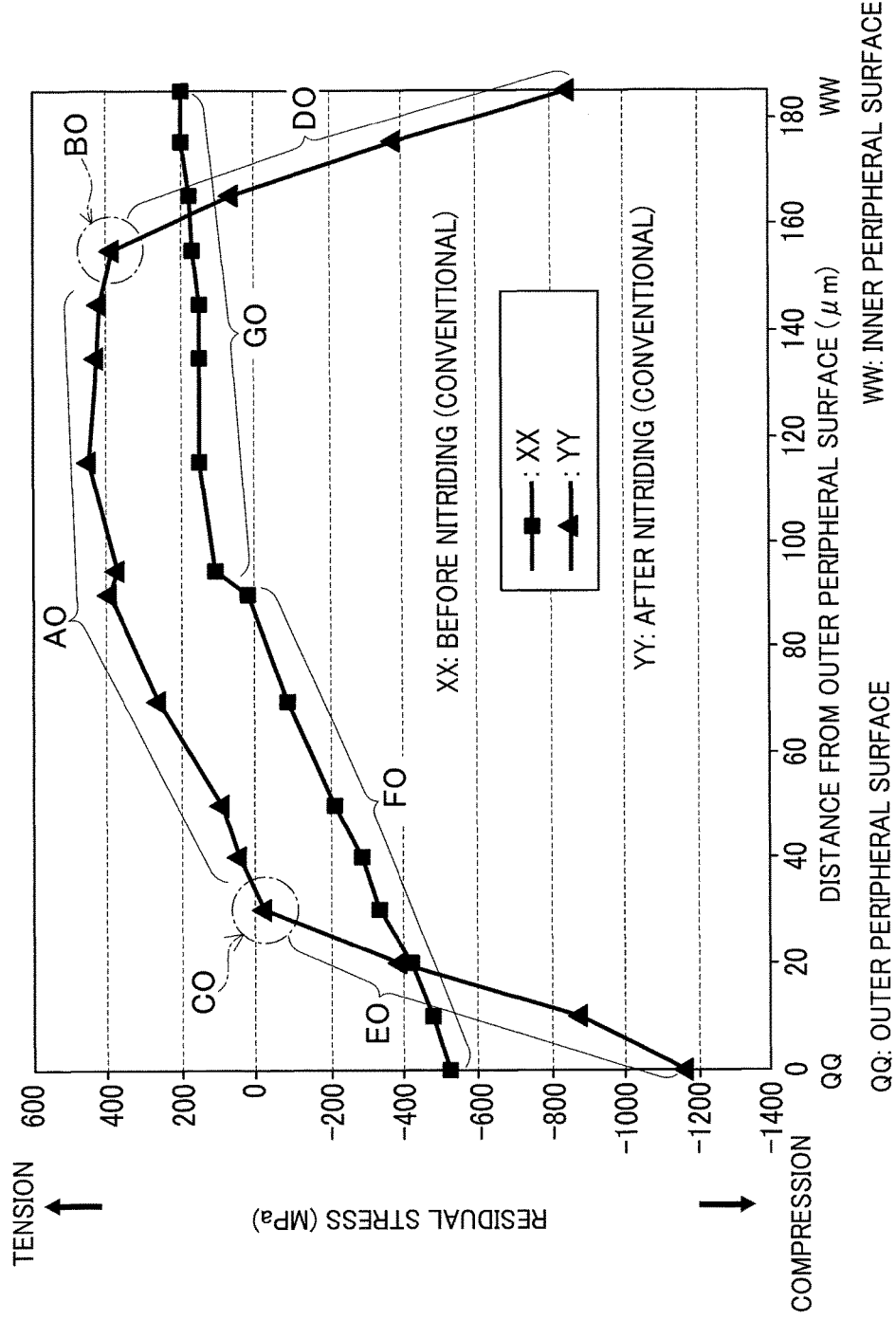
FIG. 15 is a graph showing residual stress distribution in a conventional ring body.

Examination results of residual stress distribution in the ring bodies manufactured by the aforementioned manufacturing processes using the maraging steel of the following components will be explained and further the mechanism of improving the fatigue life of the endless metal belt will be explained. FIG. 11 is a graph showing residual stress distribution in the ring bodies according to the present invention. FIG. 12 is a graph showing differences in residual stress distribution in ring bodies between a conventional art and the present invention. FIG. 14 is a graph showing fatigue life of the endless metal belt.

The alloy composition ratio (weight %) of maraging steel is defined as below: nickel (Ni) is about 17 to 19%, cobalt (Co) is about 7 to 13%, molybdenum (Mo) is about 3.5 to 4.5%, titanium (Ti) is about 0.3 to 1.0%, aluminum (Al) is about 0.05 to 0.15%, and carbon (C) is 0.03% or less.

(Examination Results of Residual Stress Distribution in the Ring Bodies)

The graph shown in FIG. 11 is a graph showing measurement results of residual stress in each of the endless metal rings manufactured by the manufacturing method of the present invention, by taking the cross section of each ring body before and after the nitriding treatment by use of an X-ray stress measuring device to measure the residual stress from the outer peripheral surface to the inner peripheral surface. A horizontal axis represents direction (μm) from the outer peripheral surface in the ring body and a vertical axis represents residual stress (MPa). In the vertical axis, a minus side indicates compressive residual stress and a plus side indicates tensile residual stress. From the above graph, before the nitriding treatment, it appears that the compressive residual stress is slightly accumulated on the outer peripheral side of the ring body, while the tensile residual stress is slightly accumulated on the inner peripheral side. However, respective values of slight compressive residual stress and slight tensile residual stress are apparent value appearing due to limitations of the measuring device. Specifically, since the ring bodies are each formed in a crowning shape protruding on the outer peripheral side, when a sample is fixed in the measuring device, the crowning is corrected to be flat. Accordingly, a measurement result shows as if the compressive residual stress is slightly accumulated on the outer peripheral side and the tensile residual stress is slightly accumulated on the inner peripheral side. It is however actually considered that the residual stress is nearly zero from the outer peripheral side to the inner peripheral side. The reason why the residual stress could be made zero from the outer peripheral side to the inner peripheral side of the ring body is that the stress-relief heat treatment (the second solutionizing) performed before the nitriding treatment could restore the crystal structure of metal texture deformed by the rolling work and the circumferential length adjusting work and substantially perfectly remove the processing strain and the internal stress (including the residual stress).

From the graph shown in FIG. 11, after the nitriding treatment, it is found that the nitrided layer is formed with a predetermined depth (about 30 to 40 μm) from each of the outer peripheral surface and the inner peripheral surface of the ring body in the nitriding treatment. This reveals that this formed nitrided layer imparts nearly the same compressive residual stresses E and D on or close to the surfaces on the outer peripheral side and the inner peripheral side. Further, the tensile residual stress A near the center in the wall thickness less varies and is almost uniform in the wall thickness direction. As a result, a value of the tensile residual stress in a region (C) where the nitrided layer on the outer peripheral side is absent, or ends, and a value of the tensile residual stress in a region (B) where the nitrided layer on the inner peripheral side is absent, or ends, are nearly equal to each other.

The graph shown in FIG. 12 is a graph showing measurement results of residual stress in each of the endless metal rings manufactured by the manufacturing method of the conventional art and the manufacturing method of the present invention by taking the cross section of each ring body after the nitriding treatment by use of an X-ray stress measuring device to measure the residual stress from the outer peripheral surface to the inner peripheral surface. A horizontal axis represents direction (μm) from the outer peripheral surface in the ring body and a vertical axis represents residual stress (MPa). In the vertical axis, a minus side indicates compressive residual stress and a plus side indicates tensile residual stress. In the above graph, by comparison of the compressive residual stress on the outer peripheral side in the ring body, that in the present invention is smaller by about 180 MPa in approximately parallel in an arrow P direction than that in the conventional ring body. By comparing a difference in compressive residual stress between the outer peripheral side and the inner peripheral surface, the conventional ring body provides a large difference in compressive residual stress between the outer peripheral surface and the inner peripheral surface that a value on the inner peripheral surface is lower by about 300 MPa than a value on the outer peripheral surface, whereas the ring body of the present invention provides an almost zero difference in compressive residual stress between the outer peripheral surface and the inner peripheral surface that a value on the inner peripheral surface is smaller by about 15 MPa than a value on the outer peripheral surface. By comparing the compressive residual stress in a region where the nitrided layer is absent on the inner peripheral side, furthermore, the ring body of the present invention is smaller by about 150 MPa in parallel in an arrow Q direction than the conventional ring body. Consequently, in the ring body of the present invention, the compressive residual stress is almost equal between the outer peripheral side and the inner peripheral side, and the tensile residual stress in the region where the nitrided layer is absent on the inner peripheral side greatly decreases than in the conventional ring body.

(Mechanism of Improving Fatigue Life of the Endless Metal Belt)

According to the manufacturing method of the present invention, the stress-relief heat treatment (the second solutionizing) is conducted before the nitriding treatment. Therefore, at a stage prior to conducting the nitriding treatment, the crystal structure of metal texture deformed by the rolling work and the circumferential length adjusting work can be restored, so that the processing strain and the internal stress (including the residual stress) can be substantially perfectly removed. Thus, the residual stress in the ring body from the outer peripheral side to the inner peripheral side can be made almost zero.

After the residual stress in the ring body from the outer peripheral side to the inner peripheral side is made almost zero, the nitriding treatment is performed. Thus, almost the same residual stress is applied on or close to the surfaces on the outer peripheral side and the inner peripheral side. The tensile residual stress near the center in wall thickness less varies and is nearly uniform in the wall thickness direction. As a result, a value of the tensile residual stress in the region where the nitrided layer on the inner peripheral side is absent and a value of the tensile residual stress in the region where the nitrided layer on the inner peripheral side is absent are almost equal. This greatly reduces a portion which has locally increased stress amplitude and will be a weakest portion apt to cause fatigue breakage when the endless metal belt is used in the belt-type continuously variable transmission.

In the present invention, furthermore, the ring body is subjected to the stress-relief heat treatment (the second solutionizing) in which the residual stress in the ring body from the outer peripheral side to the inner peripheral side is made almost zero and then subjected to the nitriding treatment. Accordingly, it is unnecessary to add the tensile residual stress previously accumulated by the rolling work and the circumferential length adjusting work and thus possible to achieve uniformization and minimization of tensile residual stress.

Since the nitrided layer is formed after the residual stress of the ring body is made almost zero before the nitriding treatment, as explained above, almost equal compressive residual stress is imparted on or close to the surfaces on the outer peripheral side and the inner peripheral side and the tensile residual stress in the region where the nitrided layer is absent can be uniformized and minimized. Consequently, when the endless metal belt 13 is used in the belt-type continuously variable transmission 100, the stress load is greatly smaller than the conventional ring body, thereby enabling large improvement of fatigue life (see FIG. 14).

The embodiment explained above may be changed in other specific forms without departing from the essential characteristics of the present invention. For instance, the present embodiment uses maraging steel as the material of the ring body but is not limited thereto. For example, precipitation hardening stainless steel, austenite stainless steel, and carbon steel (quenched steel) may be usable. In this case, in the second solutionizing step shown in FIG. 4 or 5, the solution treatment is performed for the precipitation hardening stainless steel, the stress-relief annealing is conducted for austenite stainless steel, or the quenching treatment or both of the quenching treatment and the tempering treatment is performed for the carbon steel (quench-hardened steel).

INDUSTRIAL APPLICABILITY

The present invention is available as the method for manufacturing an endless metal belt forming a power transmission belt to be used in a belt-type continuously variable transmission mounted in a vehicle, the endless metal belt, and the belt-type continuously variable transmission.

REFERENCE SIGNS LIST

1: Cylindrical body
2: Welding device
3: Annular member
4, 5, 6: Ring body
7, 8: Laminated ring body
10: Transmission belt
11: Metal element
12: Endless metal ring
13: Endless metal belt
14: Butting portion
21: Weld portion
100: Belt-type continuously variable transmission

The invention claimed is:

1. A method for manufacturing an endless metal belt to be used in a continuously variable transmission, the method including:
    performing a stress-relief heat treatment of a ring body after the ring body is subjected to a circumferential length adjusting work, and
    then, without performing another circumferential length adjusting work, performing an aging-nitriding treatment of the ring body after the stress-relief heat treatment.

2. The method for manufacturing an endless metal belt according to claim 1, wherein the circumferential length adjusting work is performed after the ring body is subjected to rolling work.

3. The method for manufacturing an endless metal belt according to claim 1, wherein the stress-relief heat treatment is performed on a plurality of ring bodies in a lamination state, each of the ring bodies having been subjected to the circumferential length adjusting work.

* * * * *